Figure 1:
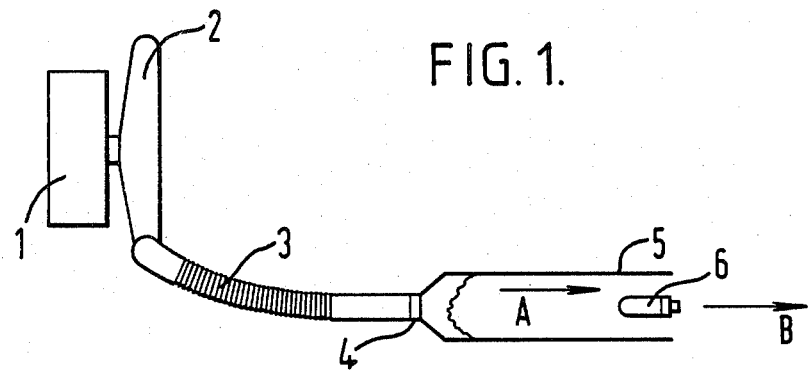
Figure 2:
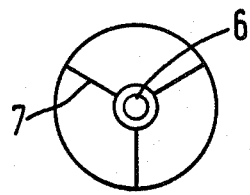
Figure 3:
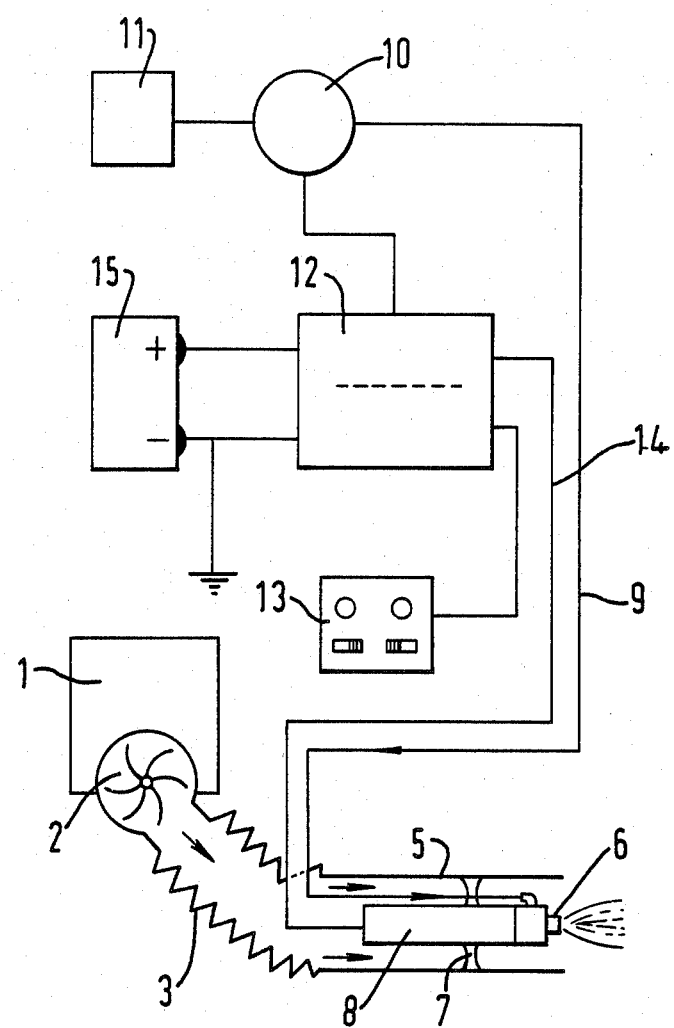

United States Patent [19]

Jackson et al.

[11] Patent Number: 4,779,805
[45] Date of Patent: Oct. 25, 1988

[54] ELECTROSTATIC SPRAYHEAD ASSEMBLY

[75] Inventors: Alastair J. Jackson; Arend L. Grocott, both of Hampshire, United Kingdom

[73] Assignee: Imperial Chemical Industries PLC, London, England

[21] Appl. No.: 841,022

[22] Filed: Mar. 17, 1986

Related U.S. Application Data

[63] Continuation-in-part of Ser. No. 534,116, Sep. 20, 1983, abandoned.

[30] Foreign Application Priority Data

Oct. 13, 1982 [GB] United Kingdom ............... 8229219

[51] Int. Cl.⁴ .............................................. B05B 5/02
[52] U.S. Cl. ...................................... 239/704; 239/296
[58] Field of Search ............... 239/690, 704, 706, 77, 239/290, 291, 296

[56] References Cited

U.S. PATENT DOCUMENTS

| | | | |
|---|---|---|---|
| 1,958,406 | 5/1934 | Darrah | 239/704 |
| 2,597,573 | 5/1952 | De Groff | 239/291 |
| 2,708,596 | 5/1955 | Weller | 239/77 |
| 3,625,426 | 12/1971 | Swanson | 239/77 |
| 3,698,635 | 10/1972 | Sickles | 239/706 |
| 4,004,733 | 1/1977 | Law | 239/3 |
| 4,009,829 | 3/1977 | Sickles | |
| 4,356,528 | 10/1982 | Coffee | 239/690 |
| 4,400,332 | 8/1983 | Pollard et al. | 239/706 |

FOREIGN PATENT DOCUMENTS

| | | | |
|---|---|---|---|
| 901969 | 7/1962 | United Kingdom . | |
| 978763 | 12/1964 | United Kingdom . | |
| 1107060 | 3/1968 | United Kingdom . | |
| 1143839 | 2/1969 | United Kingdom . | |
| 1307878 | 2/1973 | United Kingdom . | |
| 1376637 | 12/1974 | United Kingdom . | |
| 1569707 | 6/1980 | United Kingdom | 239/690 |
| 2052627 | 1/1981 | United Kingdom . | |

Primary Examiner—Andres Kashnikow
Assistant Examiner—Michael J. Forman
Attorney, Agent, or Firm—Cushman, Darby & Cushman

[57] ABSTRACT

An electrostatic spray head is charged with high voltage from a high voltage source. As a liquid to be sprayed is supplied to the spray head, the liquid is atomized predominately due to the high voltage. The spray head is located within or closely adjacent to a gas stream flowing along a path which extends in the spraying direction, so that at least some of the atomized liquid becomes entrained in the gas stream. The gas stream has a lower velocity region and a high velocity region, of which the lower velocity region is transversally closer to the spray head.

**14 Cla

ELECTROSTATIC SPRAYHEAD ASSEMBLY

This is a continuation-in-part of application Ser. No. 534,116, filed Sept. 20, 1983 which was abandoned.

This invention relates to electrostatic sprayhead assemblies for use with spraying devices of the type employing a blast of gas to assist transport of the liquid being sprayed.

Such devices include mistblowers which have been known for many years as a convenient and effective way of applying pesticides to crops. They may be either portable or tractor mounted. A portable machine will, for example, typically comprise an engine (e.g. a two-stroke petrol engine) driving a fan which provides a strong current of air to a spray lance carried in the operator's hand. A liquid spray reservoir, carried with the engine or fan on the operator's back, feeds liquid pesticides to a nozzle within the spray lance. The force of the air current passing through the nozzle spray lance shatters the liquid emerging from the nozzle into fine droplets, which are entrained in the current of air. They pass out through the head of the lance, and are carried by the current of air onto and into the crop being sprayed.

Mistblowers have the advantage that they produce much better penetration of pesticide sprays into crops than is obtained with devices which do not have air assistance. They can also be used to spray objects above the level of the sprayer, e.g. fruit trees. However, they do have certain disadvantages. Thus, the strong current of air they produce can carry some pesticide droplets right through the crop. Such droplets may then drift for considerable distances, and become a potential ecological hazard. This problem is increased by the method of formation of the droplets. Droplets produced by a fluid shear mechanism tend to be quite irregular in size. Many droplets are thus produced below the ideal size, and these small droplets are particularly prone to drift for long distances.

Electronic spraying processes are known which produce a spray of charged droplets. Such spraying processes have numerous advantages, including in particular that charged droplets are positively attracted to target plants by electrostatic forces, and coat them evenly. Both upper and lower sides of leaves can be coated. However, because of the attractive electrostatic forces, the charged spray particles find it difficult to penetrate far into a crop canopy.

Electrostatic spraying processes are of two main types. In the first type the spray droplets are formed by air or liquid pressure prior to charging, such charging typically being performed with corona discharge electrodes. Sprays formed in this way are relatively insensitive to ambient conditions including air flow, and indeed often utilise air-shear for droplet formation.

In the second type, atomisation of liquid into spray droplets takes place under the influence of an electric charge on the sprayhead, atomisation being caused predominantly by electrical forces. Such processes produce a fine uniform droplet size with light charging efficiency but are sensitive to ambient conditions such as air-flow which can interfere with spray formation.

We have now found surprisingly that it is possible to obtain satisfactory spray formation with processes of the second type when the sprayhead is located directly within the air stream produced by an air blower. In this way the advantages of efficient spray formation can be combined with the benefit of air assistance to give good crop penetration and efficient crop coverage with reduced spray drift.

Accordingly the present invention provides a sprayhead assembly comprising an electrostatic sprayhead chargeable to a high voltage and adapted to atomise liquid to be sprayed at least predominantly by means of the high voltage, the sprayhead being connectable to sources of high voltage and liquid; and a means for forming a stream of gas, in which the sprayhead is located within or closely adjacent to the stream of gas in use whereby atomised liquid formed by the sprayhead is at least partly entrained in the stream of gas.

The means for forming the stream of gas is conveniently a channel connectable to a source of gas which is generated directly or indirectly by a powered blower.

The electrostatic sprayhead is preferably of the type disclosed in our UK Pat. No. 1569707 having an earthed field intensifying electrode adjacent to an electrostatically charged spray nozzle.

Specific embodiments of the invention will now be described with reference to the drawings, in which:

FIG. 1 is a partial diagrammatic side view of a sprayhead assembly according to the invention connected to an air blower.

FIG. 2 is an end view of the apparatus of FIG. 1;

FIG. 3 is a line diagram including a sprayhead assembly similar to that shown in FIG. 1 and showing the control and supply system therefor;

FIG. 4 is a more detailed, exploded, axial, sectional view of the sprayhead forming part of the assembly of FIG. 3;

FIG. 5 is an axial section through another sprayhead assembly according to the invention showing a part of an air supply therefore; and FIG. 6 is a plan of the assembly of FIG. 5.

The drawings are not to scale.

Referring to FIGS. 1 and 2 of the drawings an air blower consisting of a motor (1) and a fan (2) delivers air to a flexible tube (3) connected by a detachable coupling (4) to a pipe (5) of diameter approximately 9 cms forming a channel for a stream of air. The pipe (5) positions and supports electrostatic sprayhead (6) (approximate diameter 4 cm) via internal struts (7) within the stream of air (diagrammatically illustrated by arrow A of FIG. 1) delivered by the blower.

The electrostatic sprayhead (6) is of the type described in our UK Pat. No. 1569707 having an earthed field adjusting electrode surrounding and insulated from a conducting spray nozzle charged to a potential of about 25 kilovolts.

The sprayhead is provided with a liquid supply via a flexible tube (not shown) connected to a pump. It is likewise provided with electrical connections (not shown) to earth and to a source of high voltage.

Referring to FIG. 3 in an arrangement similar to that of FIGS. 1 and 2 the sprayhead (6) is connected to a high voltage generator (8) also located in the airstream generated by the blower (2). The sprayhead is located approximately flush with the exit of pipe (5) and is supplied with liquid via line (9) from a metering pump (10) fed from a liquid container (11) and controlled from control box (12) and control console (13). Pump (10) may be electrically driven or use engine power or pressurised gas etc. Console (13) also controls the electrical input to the high voltage generator (8) via line (14) and control box (12).

Power is supplied to the control box from a battery (15).

Figure 4:
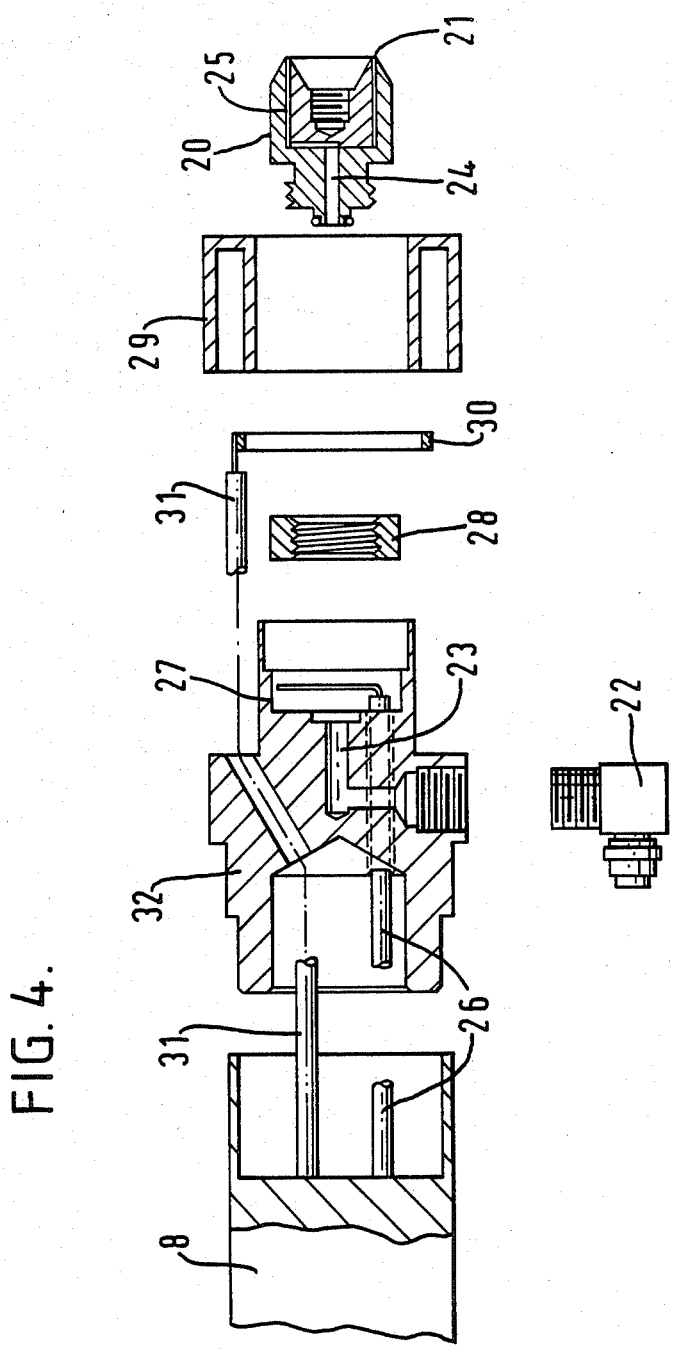

Referring to FIG. 4 the sprayhead is seen to comprise a nozzle (20) of conducting material, shaped to provide an annular edge (21) from which liquid is atomised by high voltage applied to the nozzle. Liquid is supplied to the nozzle from inlet (22) via liquid channels (23, 24 and 25). High voltage is supplied to the nozzle from generator (8) via lead (26) when the nozzle (20) is screwed into recess (27) in connecting piece (32) with internally threaded collar (28).

The nozzle (20) is surrounded by a hollow insulating sleeve (29) in which a ring-shaped field-adjusting electrode (30) is located. Electrode (30) is connected to earth via lead (31).

In operation (in spraying a crop with pesticide for example) the sprayhead (6) is supplied with liquid and the appropriate electrical connections are made, resulting in a spray of highly charged particles of very uniform size being incorporated into the stream of air supplied by the blower. The droplets will of course tend to fan out but the overall effect is for the movement of particles towards the crop to be reinforced, and the spray characteristics to be influenced, by the airstream from the blower.

The apparatus illustrated is especially suitable for mounting on knap-sack frames and tractors and can be used to spray crops at a variety of angles.

The air blast materially increases penetration into the crop, thereby improving pesticide deposition within it. However, there is a much reduced tendency for droplets to be carried through the crop, because of the electrostatic force between crop and particles. In general, charged droplets carried through the crop are able to overcome the force of the airflow, by this time much attenuated, and are attracted back onto the crop. Because of the uniformity of particle size produced by electrostatic atomisation, drifting problems are much reduced.

Typical operating parameters are as follows:

| | |
|---|---|
| Air speed (at outlet) | 20–25 meters/sec |
| Nozzle to crop distance | 2–4 meters |
| Droplet size | approx. 30 μm |
| at nozzle voltage | approx. 30 kv |
| and liquid flow rate | 0.05 ml/sec |

Figure 5:
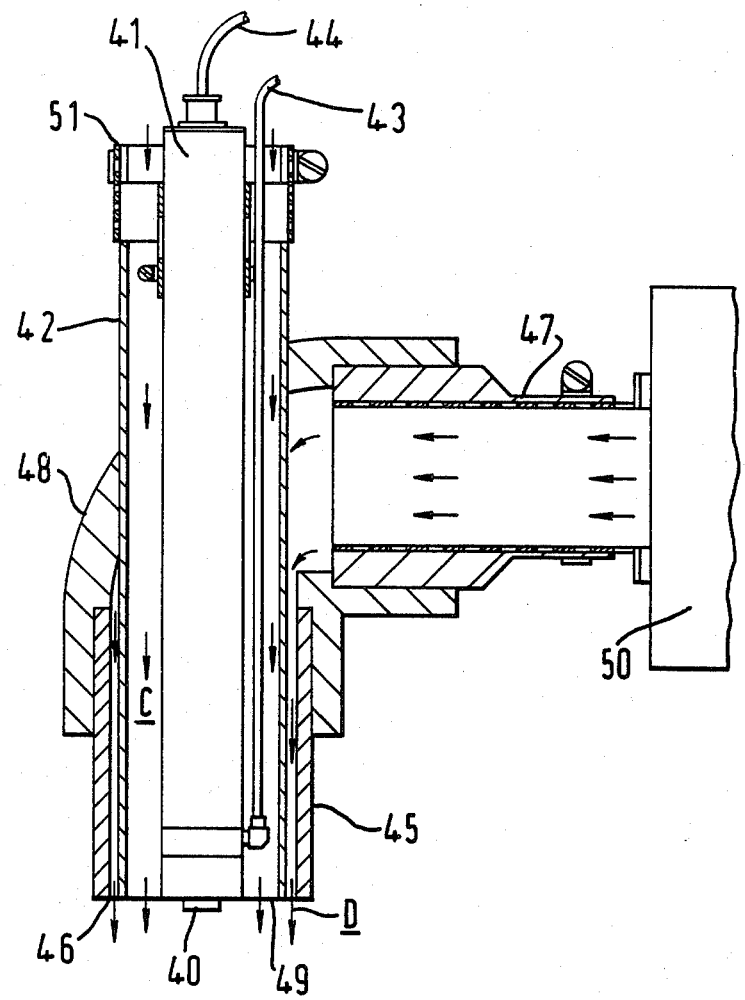
Figure 6:
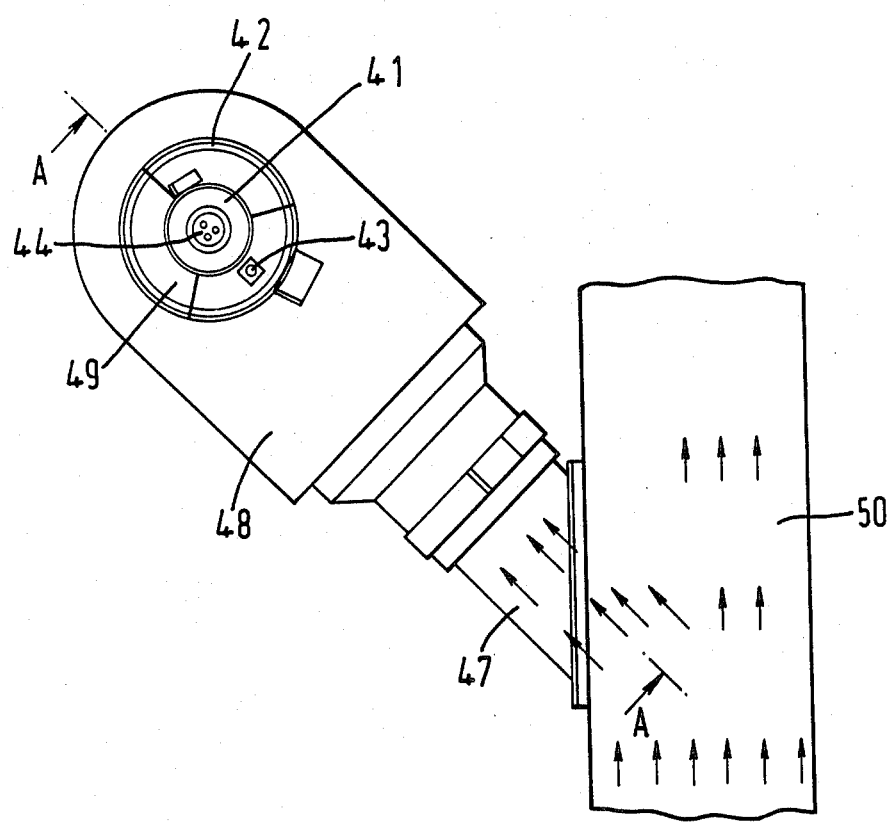

Referring to FIGS. 5 and 6 an alternative sprayhead assembly comprises a nozzle (40) and a generator (41) of the type illustrated in FIG. 4. Liquid and electrical input are provided via connections (43) and (44), respectively. The nozzle (40) is mounted within a pipe (42) which is open at both ends and provides a channel (49) for a stream of air, as hereinafter described. An outlet of the nozzle (40) is disposed at or near the same axial location, i.e. at or near the same location in the spraying direction, as an outlet end of the pipe (42).

The outlet-end of pipe (42) is surrounded by a second pipe (45) forming an annular air channel (46) between the two pipes. Channel (46) is supplied with air under pressure from a pipe (47) via an elbow union (48). Pipe (47) is connected to an air trunking system 50 carried on a tractor (not shown).

In use, a stream of relatively fast-flowing pressurized air from the pipe (47) flows through the channel (46), as indicated by the arrow D. This stream D draws a stream C of relatively slow-moving atmospheric air into an open inlet (51) of the pipe (42) and past the nozzle (40). It is found that this arrangement interferes less with spray formation especially under more marginal conditions which may arise from faster liquid flow-rates or the use of liquids which do not atomize so well.

The reason for this can be understood by considering the flow conditions in an assembly having only a single pressured air-stream which flows through the channel 49 of FIG. 5. The effect of this air-stream is to produce a region of low pressure adjacent the outlet of the nozzle 40. Within this low pressure region there is considerable turbulence, which disturbs the formation of cones and ligaments of liquid otherwise produced by the electrostatic atomization process and leads to contamination of nearby parts of the assembly. In fact, atomization is largely effected by air-shearing of the liquid, rather than electrostatic forces, and there is a wide variation in the size of atomized droplets of liquid.

With the assembly of FIG. 5, the lower velocity stream C does not produce a low pressure region adjacent the nozzle outlet and the electrostatic atomization process is undisturbed. Once the droplets have been formed and have moved away from the nozzle outlet they are, however, entrained by the higher velocity stream D, which carries them towards and into the crop.

In FIG. 5 the outlet of the nozzle is a short distance downstream of the outlet end of the pipe (42). In alternative embodiments the nozzle outlet has the same location in the spraying direction as does the pipe outlet. In further embodiments the nozzle may be a short distance upstream of the pipe outlet, provided the liquid and air flow and the electrical parameters are not such as to cause droplets to be deposited on the inner surface of the pipe 49.

Typical operating parameters are:

| | |
|---|---|
| Fluid flow rate | up to 1 ml/sec |
| Nozzle voltage | 20–40 kv |
| Air volume of pressurised air | greater than 2.5 cubic meters/min |
| Air speed of pressurised air | 20–40 meters/sec |

Sprayhead assemblies of the present invention may be used singly or mounted in linear or circular arrays comprising more than one assembly. Circular arrays may be adapted to spray either in a radial or an axial direction.

It is also within the scope of the invention for more than one sprayhead to be located within a given air stream.

Examples of results obtained using a sprayhead assembly of the type illustrated with reference to FIGS. 1–4 will now be described.

EXAMPLE 1

Bush tomato plants were sprayed to control whitefly using a pesticide formulation containing cypermethrin. Percentage control relative to untreated plants are recorded. Comparative results using a similar sprayhead without air assistance and a conventional hydraulic nozzle were also obtained.

The sprayhead assembly of the invention was operated as follows:

| | |
|---|---|
| Air speed at outlet | 20–25 meters/sec |
| Nozzle to crop distance | 2–4 meters |

-continued

| Droplet size | approx. 30 μm. |
| Nozzle voltage | approx. 30 kv |
| Flow rate of pesticide | 0.05 ml/sec |

The other sprayheads were operated at what were judged to be optimum conditions.

The results are given in Table I.

TABLE I

% Control against untreated
1 liter/ha = 15 g active ingredient/ha

| Days after treatment | Electrostatic sprayhead no air assistance | Present invention | Conventional 45 g ai/ha, 400 l/ha |
| --- | --- | --- | --- |
| 1 | 51 | 98 | 36 |
| 4 | 76 | 97 | 15 |

The results show the present invention to give by far the greatest initial knock-down and also the longest persistence in spite of the conventional treatment being applied at three times the rate per hectare.

EXAMPLE 2

Trials were performed to indicate optimum air speed. Results are set out in Tables II and III from which it is seen that better results are obtained at somewhat lower air speeds than conventionally used with air blowers.

Comparison of Different Operating Parameters

| (i) Crop | tomatoes |
| Pest | Whitefly |
| Pesticide | cypermethrin |
| Rate | 1 liter/ha 15 g ai/ha |

TABLE II

% Control Compared with Untreated: 1 Day After Treatment

| | Air Speed 25 m/s at outlet | Air Speed 50 m/s at outlet |
| --- | --- | --- |
| Top Canopy | 90 | 78 |
| In-Canopy | 73 | 60 |

| (ii) Crop | Cucumbers |
| Pest | Whitefly |
| Pesticide | cypermethrin |
| Rate | 1 liter/ha = 15 g active ingredient/ha |

TABLE III

% Control Compared with Untreated: 1 Day After Treatment

| | Air Speed 25 m/s at outlet | Air Speed 50 m/s at outlet |
| --- | --- | --- |
| Top Canopy | 87 | 71 |
| In-Canopy | 83 | 65 |

The results show that an air speed of 25 m/s at the air outlet gives superior top canopy and in-canopy control to the higher air speed of 50 m/s at the outlet.

We claim:

1. An electrostatic sprayhead assembly, comprising: an electrostatic spray head; means connected to said spray head for supplying liquid to said spray head; a source of high voltage; means connecting said spray head with said source of high voltage for charging said spray head to a high voltage as liquid is supplied to said spray head, thereby coacting with said spray head for atomizing that liquid predominantly by means of said high voltage, as such liquid issues from said sprayhead;

means for forming a gas stream having a velocity along a path in a spraying direction;

said spray head being located within or closely adjacent to said gas stream path such that at least some of the atomized liquid issued from said sprayhead in use become entrained in said gas stream for transport in said direction therewith;

said gas stream forming means including:

means for forming a first, lower velocity gas stream region located closer to said spray head in a direction transversally of said path, this means having an inlet and an outlet;

means for forming a second, high velocity gas stream region located further from said sprayhead in a direction transversally of said path, with said first, lower velocity gas stream region intervening between said sprayhead and said second higher velocity gas stream region, this means also having an inlet and an outlet; and an outlet of said sprayhead being disposed at or near the same location in said spraying direction as said outlet of said means for forming said first, lower velocity gas stream region.

2. The electrostatic sprayhead of claim 1, wherein: said means for forming a second, high velocity gas stream region comprises means defining an annular channel at least generally circumferentially surrounding both said electrostatic sprayhead and said means for forming said first, lower velocity gas stream region.

3. The electrostatic sprayhead of claim 2, wherein: said means for forming said first, lower velocity gas stream region comprises means defining another annular channel at least generally circumferentially surrounding said electrostatic sprayhead.

4. The electrostatic sprayhead assembly of claim 2, comprising:

a high voltage generator disposed in proximity to said sprayhead and in position to be at least partially circumferentially surrounded, in use, by said gas stream for providing said source of high voltage.

5. The electrostatic sprayhead assembly of claim 4, wherein:

said means for forming said first, lower velocity gas stream region comprises means defining another annular channel at least generally circumferentially surrounding said electrostatic sprayhead.

6. The electrostatic sprayhead assembly of claim 5, wherein:

said sprayhead, said means for forming said first, lower velocity gas stream region, and said means for forming said second, higher velocity gas stream region are mutually substantially coaxial with one another.

7. The electrostatic sprayhead of claim 1, wherein: said inlet of said means for forming a first, lower velocity gas stream region is constructed and arranged for communication to a lower pressure source of gas;

said inlet of said means for forming a second, higher velocity gas stream region is constructed and arranged to be connected to a higher pressure source of gas;

said means for forming a gas stream being constructed and arranged to place said outlet of said second, high velocity gas stream region, in use, in such effective contact with said outlet of said first, lower velocity gas stream region as to cause gas to be drawn into said means for forming said first, lower velocity and stream region through said inlet thereof from said lower pressure source of gas for providing said first, lower velocity gas stream region.

8. The electrostatic sprayhead of claim 7, wherein:

said inlet of said means for forming a first, lower velocity gas stream region comprises means for communicating said means for forming said first lower velocity gas stream region to atmospheric air as said lower pressure source of gas; and said inlet of said means for forming a second, higher velocity gas stream region comprises a source of pressurized air and means for communicating said means for forming said second, higher velocity gas stream region to said source of pressurized air as said higher pressure source of gas.

9. The electrostatic sprayhead assembly of claim 1, further including:

a high voltage generator disposed in proximity to said sprayhead and in position to be at least partially circumferentially surrounded, in use, by said gas stream for providing said source of high voltage.

10. The electrostatic sprayhead assembly of claim 9, wherein:

said means for forming said first, lower velocity gas stream region comprises means defining another annular channel at least generally circumferentially surrounding said electrostatic sprayhead.

11. The electrostatic sprayhead assembly of claim 10, wherein:

said sprayhead, said high voltage generator, said means for forming said first, lower velocity gas stream region, and said means for forming said second, higher velocity gas stream region are mutually substantially coaxial with one another.

12. The electrostatic sprayhead assembly of claim 11, wherein:

said high voltage generator is disposed axially behind said sprayhead.

13. The electrostatic sprayhead assembly of claim 12, wherein:

said inlet of said means for forming a first, lower velocity gas stream region comprises a source of lower pressure gas and means for communicating said means for forming said first lower velocity gas stream region to said lower pressure source of gas;

said inlet of said means for forming a second, higher velocity gas stream region comprises a source of pressurized air and means for communicating said means for forming said second, higher velocity gas stream region to said higher pressure source of gas;

said means for forming a gas stream being constructed and arranged to place said outlet of said second, higher velocity gas stream region, in use, in such effective contact with said outlet of said first, lower velocity gas stream region as to cause gas to be drawn into said means for forming said first, lower velocity gas stream region through said inlet thereof from said lower pressure source of gas for providing said first, lower velocity gas stream region.

14. The electrostatic sprayhead assembly of claim 13, wherein:

said inlet of said means for forming a first, lower velocity gas stream region comprises means for communicating said means for forming said first lower velocity gas stream region to atmospheric air as said lower pressure source of gas; and said inlet of said means for forming a second, higher velocity gas stream region is comprises a source of pressurized air and means for communicating said means for forming said second, higher velocity gas stream region to said source of pressurized air as said higher pressure source of gas.

* * * * *